[12] United States Patent
Liao et al.

(10) Patent No.: US 7,499,218 B1
(45) Date of Patent: Mar. 3, 2009

(54) ILLUMINATION SYSTEM

(75) Inventors: Cheng-Shun Liao, Hsinchu (TW); S-Wei Chen, Hsinchu (TW); Sung-Nan Chen, Hsinchu (TW); Chao-Shun Chen, Hsinchu (TW); Mei-Ling Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/848,901

(22) Filed: Aug. 31, 2007

(51) Int. Cl.
*G02B 27/14* (2006.01)
*G02B 27/30* (2006.01)
*G02B 5/04* (2006.01)

(52) U.S. Cl. ............... 359/636; 359/632; 359/638; 359/641; 359/618; 359/833; 353/31; 362/606

(58) Field of Classification Search .......... 359/618, 359/625–628, 630, 632, 634, 636, 641, 833, 359/834; 362/231, 245, 297, 309, 600; 353/20, 353/31, 32, 34, 37; 356/71, 246, 301, 369, 356/389, 391, 515; 372/12, 15, 16, 66, 70, 372/90, 99, 100, 108; 385/147; 348/E9.027
See application file for complete search history.

(56) References Cited

U.S. PATENT DOCUMENTS 2,101,728 A * 12/1937 Bellingham et al. ......... 359/638
3,217,623 A * 11/1965 Hotchkiss .................... 396/21
5,765,934 A    6/1998 Okamori et al.
5,777,788 A *  7/1998 Noguchi ..................... 359/487
6,545,814 B2 * 4/2003 Bartlett et al. .............. 359/636
7,329,007 B2 * 2/2008 Karasawa et al. ............ 353/31
2005/0128730 A1 6/2005 Shindoh

* cited by examiner

*Primary Examiner*—Loha Ben
(74) *Attorney, Agent, or Firm*—J.C. Patents

(57) ABSTRACT

An illumination system including at least one first light source, a prism and a light uniforming device is provided. The first light source is capable of providing a first beam. The prism is disposed on a transmission path of the first beam, and has four first facets. Two of the first facets are opposite to each other, and the other two first facets are opposite to each other. The first beam passes through one of the first facets and is totally internally reflected by another first facet opposite to the one of the first facets. The light uniforming device is disposed on the transmission path of the first beam from the another first facet. The cost of the illumination system is lower, and the illumination system has high flexibility of the light source design and can provide illumination with high brightness.

19 Claims, 12 Drawing Sheets

ILLUMINATION SYSTEM

BACKGROUND OF THE INVENTION

1. Field of the Invention

The present invention relates to an illumination system. More particularly, the present invention relates to an illumination system with beam combining function.

2. Description of Related Art

U.S. Pat. No. 5,765,934 has disclosed a light-refracting element applied in a light source in its first embodiment. The light source has a lamp for emitting a beam of luminous flux. The light-refracting element is disposed in the vicinity of the converging point of the beam of luminous flux, and takes the form of a cone. The flat surface of the light-refracting element facing the lamp. The beam of luminous flux is incident on the flat surface, and passes through and is refracted by the light-refracting element. Then, the beam of luminous flux exits from the conical surface of the light-refracting element. Through the refraction effect of the light-refracting element, the beam of luminous flux exiting from the light-refracting element is more uniform. The light-refracting element is applied in the light source with a single lamp, and does not have beam combining function.

U.S. Pat. No. 5,765,934 has also disclosed a reflective prism applied in a light source in its sixth embodiment. The light source has two lamps for emitting two beams of luminous flux. The reflective prism has two opposing reflecting surfaces which are located in the vicinity of the converging points of the two beams, respectively. The two reflecting surfaces reflect the two beams from the lamps to a mirror. Because the reflecting surfaces are located close to the converging points of the two beams where the temperature is high, reflecting films on the reflecting surfaces must be made of the material which resist high temperature, and thus the cost of the reflecting films is high.

SUMMARY OF THE INVENTION

The present invention is directed to an illumination system, which has high flexibility of the light source design and a low cost.

Other advantages of the present invention can be further understood from the technical features disclosed by the present invention.

An embodiment of the present invention provides an illumination system including at least one first light source, at least one first prism and a light uniforming device. The first light source is capable of providing a first beam. The first prism is disposed on a transmission path of the first beam, and has four first facets. Two of the first facets are opposite to each other, and the other two of the first facets are opposite to each other. The first beam passes through one of the first facets and is totally internally reflected by another first facet opposite to the one of the first facets. The light uniforming device is disposed on the transmission path of the first beam from the another first facet.

An embodiment of the present invention also provides an illumination system including at least one first light source, at least one second light source, at least one third light source, a beam combining device and a light uniforming device. The first light source is capable of providing a first color beam. The second light source is capable of providing a second color beam. The third light source is capable of providing a third color beam. Colors of the first color beam, the second color beam and the third color beam are different from one another. The beam combining device includes two first dichroic units, two second dichroic units and four third dichroic units. The second dichroic units are disposed opposite to the first dichroic units respectively. Two of the third dichroic units is disposed opposite to the two first dichroic units respectively, and the other two of the third dichroic units is disposed opposite to the two second dichroic units respectively. The first color beam passes through one of the first dichroic units, is reflected by one of the second dichroic units opposite to the one of the first dichroic units, and passes through one of the third dichroic units adjacent to the one of the second dichroic units in order. The second color beam passes through the one of the second dichroic units and the one of the third dichroic units in order. The third color beam is reflected by the one of the third dichroic units. The light uniforming device is disposed on transmission paths of the first, second and third color beams from the one of the third dichroic units.

In the illumination system according to the embodiment of the present invention, the prism is capable of combining at least four beams, and the beam combining device is capable of combining twelve beams, such that the illumination system has a lot of light sources, so as to have high flexibility of the light source design.

In order to make the aforementioned and other features and advantages of the present invention comprehensible, preferred embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
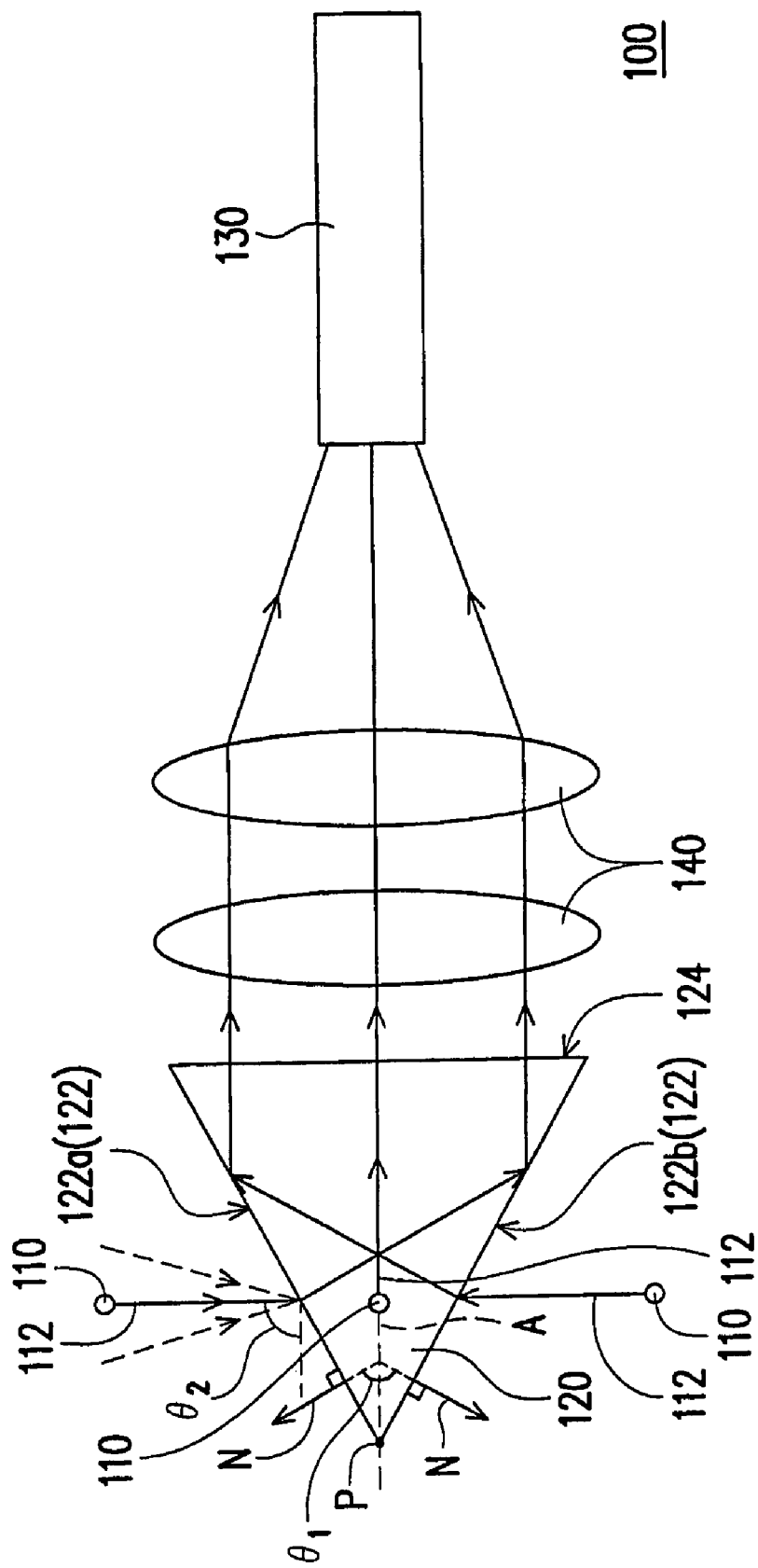
FIG. 1A is a schematic structural view of an illumination system according an embodiment of the present invention.
Figure 1B:
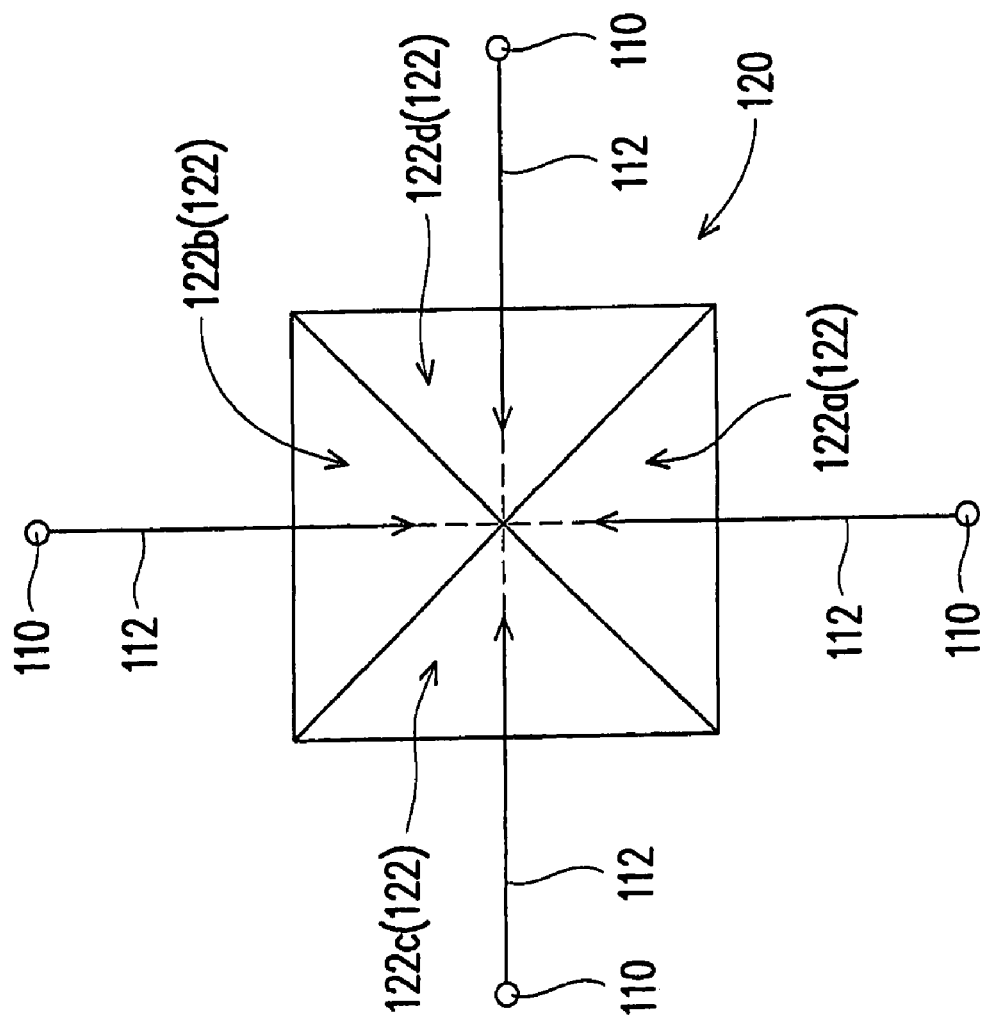
FIG. 1B is a schematic top view of the prism and the light sources in FIG. 1A.
Figure 1C:
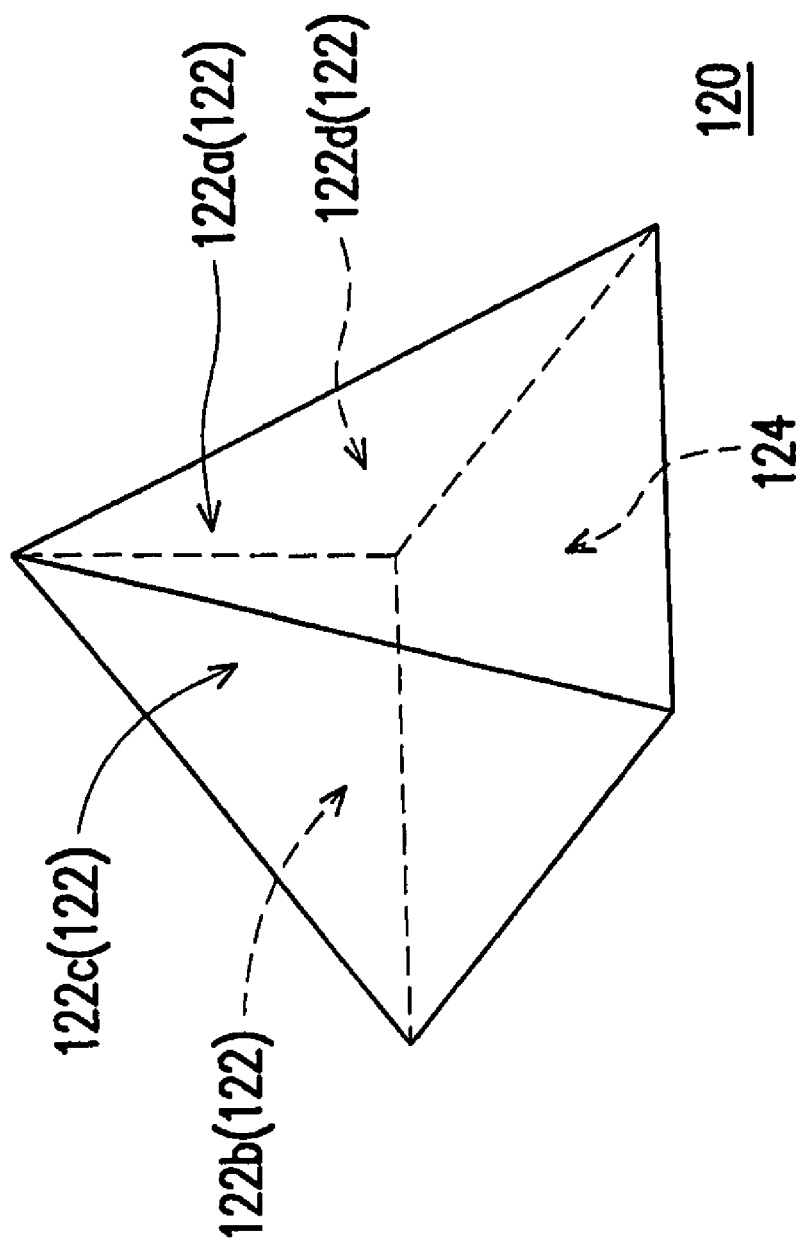
FIG. 1C is a schematic perspective view of the prism in FIG. 1A.

Referring to FIGS. 1A to 1C, an illumination system 100 in this embodiment is applied in a projection apparatus (not shown). The illumination system 100 includes a plurality of first light sources 110, a first prism 120 and a light uniforming device 130. Each first light source 110 is capable of providing a first beam 112. The first prism 120 is disposed on a transmission path of each first beam 112, and has four first facets 122, such as the first facets 122a, 122b, 122c and 122d shown in FIG. 1B. Two of the first facets 122, such as the first facets 122a and 122b, are opposite to each other, and the other two of the first facets 122, such as the first facets 122c and 122d, are opposite to each other. Each first beam 112 passes through one of the first facets 122, such as the first facet 122a, and is totally internally reflected by another first facet 122, such as the first facet 122b, opposite to the one of the first facets 122. The light uniforming device 130 is disposed on the transmission path of each first beam 112 from the another first facet 122. The light uniforming device 130 is, for example, a light integration rod. However, in other embodiments, the light uniforming device is also a lens array or other devices capable of uniforming light.

In this embodiment, the first prism 120 further has a second facet 124. Each first beam 112 reflected by the another first facet 122 travels to the light uniforming device 130 through the second facet 124. In addition, normal vectors N of every two first facets 122 opposite to each other, such as first facets 122a and 122b, make an angle $\theta_1$ falling in a range from 38 degrees to 69 degrees, and the refractive index of the first prism 120 falls in a range from 1.4 to 1.78, such that each of the another first facets 122 totally internally reflects one of the first beam 112. Moreover, the first prism 120 has an apex P located among the four first facets 122 and a symmetry axis A passing through the apex P. The incident direction of each first beam 112 incident on the first prism 120 and the symmetry axis A make an angle $\theta_2$ falling in a range from 70 degrees to 110 degrees. In other words, each first beam 112 is well-collimated and roughly perpendicular to the symmetry axis A, so as to be totally internally reflected by the another first facet 122. In this embodiment, each light source 110 is, for example, a laser for emitting the well-collimated first beam 112. However, in other embodiment, each light source is a light emitting diode, a lamp or other light sources capable of emitting a well-collimated beam. For example, a lamp having a lampshade and/or a lens may be adopted, wherein the lampshade and the lens are used to collimate the beam.

In this embodiment, the illumination system 100 further includes at least one lens 140, disposed on the transmission path of each first beam 112 between the first prism 120 and the light uniforming device 130, so as to condense each first beam 112 on the light uniforming device 130.

In the illumination system 100 in this embodiment, the angle $\theta_1$ made by the normal vectors N of every two first facets 122 opposite to each other is designed to make each first beam 112 be totally internally reflected by one of the first facets, such that each first beam 112 is collimated rather than condensed. Therefore, the first prism 120 is not necessary for resisting high temperature caused by the condensed beam as in the prior art, which makes the material of the first prism 120 be selected from more inexpensive ones. Moreover, because the heat-resistant reflecting film as in the prior art can be not needed in the illumination system 100, the cost of the illumination system 100 is reduced.

In this embodiment, the illumination system 100 has four first light sources 110 as shown in FIG. 1B, and the first prism 120 combines the four first beam 112 and make them travel to the light uniforming device 130. Because there is just the first prism 120 but no other beam combining devices in the transmission path of the first beams 112, the light loss in the illumination system 100 is lower, which increases the light using efficiency of the illumination system 100. It should be noted that the number of the first light sources 110 in the illumination is not limited to four in the present invention. In other embodiments, the number of the first light sources 110 may be other number, such as one, two or three. In this embodiment, the first prism 120 is capable of combining four first beams 112, such that the illumination system 100 has a lot of first light sources 110, so as to have high flexibility of the light source design and provide illumination with high brightness. In addition, when the illumination system 100 is applied in a projection apparatus, it increases the contrast of the picture projected by the projection apparatus. In this embodiment, the colors of the four first beams 112 are the same, or the colors of at least parts of the four first beams are also different. For example, the colors of the four first beams 112 are all white, or include red, green and blue.

Figure 2A:
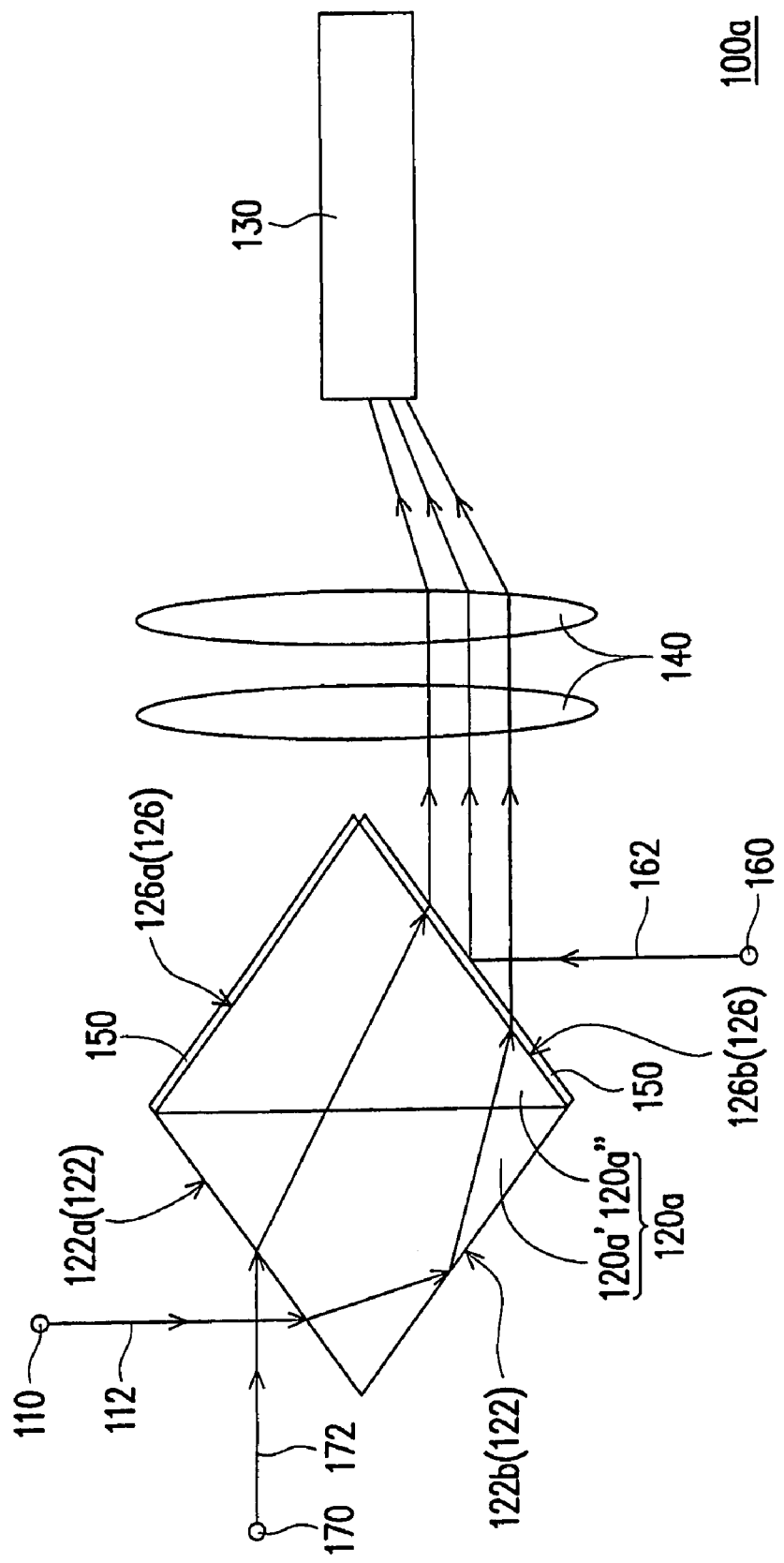
FIG. 2A is a schematic structural view of an illumination system according another embodiment of the present invention.
Figure 2B:
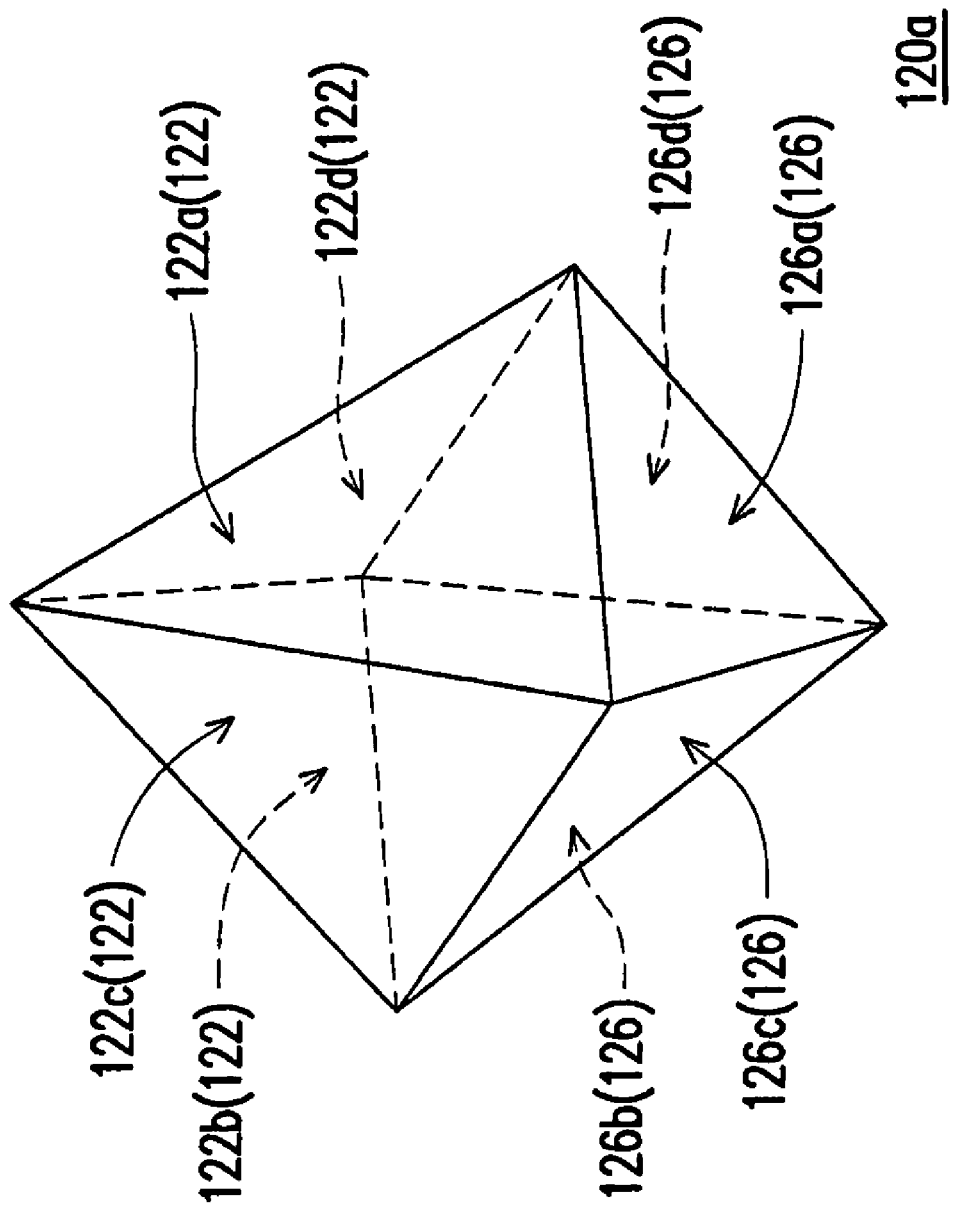
FIG. 2B is a schematic perspective view of the prism in FIG. 2A.

Referring to FIGS. 2A and 2B, an illumination system 100a in this embodiment is similar to the above illumination system 100 shown in FIG. 1A, and the differences between the two are described below. A first prism 120a is similar to the above first prism 120 shown in FIG. 1A, except that the first prism 120a further has four third facets 126. The four third facets 126 are respectively opposite to the four first facets 122. For example, the third facet 126a is opposite to the first facet 122b. Two of the third facets 126 are opposite to each other, and the other two of the third facets 126 are opposite to each other. For example, the third facet 126a is opposite to the third facet 126b, and the third facet 126c is opposite the third facet 126d.

In this embodiment, the illumination system 100a further includes four dichroic units 150 disposed on the four third facets 126 respectively. In addition, the illumination system 100a includes one first light source 110 and further includes a second light source 160 capable of providing a second beam 162. Colors of the first beam 112 and the second beam 162 are different from each other. Hence, the second beam 162 is reflected to the light uniforming device 130 by one of the dichroic units 150, and the first beam 112 from the another first facet 122, such as the first facet 122b, passes through the one of the dichroic units 150. In this embodiment, the dichroic units 150 are, for example, dichroic films. However, in other embodiments, the dichroic units may also be dichroic mirrors.

The illumination system 100a may include a third light source 170 capable of providing a third beam 172. The third beam 172 passes through one of the first facets 122, such as the first facet 122a, and one of the third facet 126, such as the third facet 126b, opposite to the one of the first facets 122 in order, and then travels to the light uniforming device 130. More particularly, the third beam 172 passes through the one of the first facets 122, the one of the third facets 126 and the dichroic unit 150 on the one of the third facets 126 in order. In other words, the color of the third beam 172 is different from the color of the second beam 162. Moreover, in this embodiment, the first prism 120a is the combination of a sub-prism 120a' and a sub-prism 120a", in which the sub-prism 120a' is similar to the above first prism 120 shown in FIG. 1A. However, in other embodiments, the first prism 120a is also integrally formed.

In the illumination system 100a, the first prism 120a has similar advantages as those of the first prism 120 shown in FIG. 1A. In addition, the wavelength tolerance of the dichroic units 150 is larger, such that the cost of the dichroic units 150 is low, which reduce the cost of the illumination system 100a. In this embodiment, the first prism 120a combines three beams (i.e. the first beam 112, the second beam 162 and the third beam 172) from three light sources (i.e. the first light source 110, the second light source 160 and the third light source 170), and the colors of the three beams are, for example, red, green and blue. However, the number of the light sources is not limited to three in the present invention, and the number of the light sources is other values in other embodiments, which makes the illumination system have high flexibility of the light source design. For example, the illumination system 100a has twelve light sources, such as four first light sources 110, four second light sources 160 and four third light sources 170. The four first beams 112 pass through the four first facets 122, respectively. The four second beams 162 are reflected by the four dichroic units 150, respectively. The four third beams 172 pass through the four first facets 122, respectively. Therefore, the illumination system 100a provides illumination with high brightness.

Figure 3A:
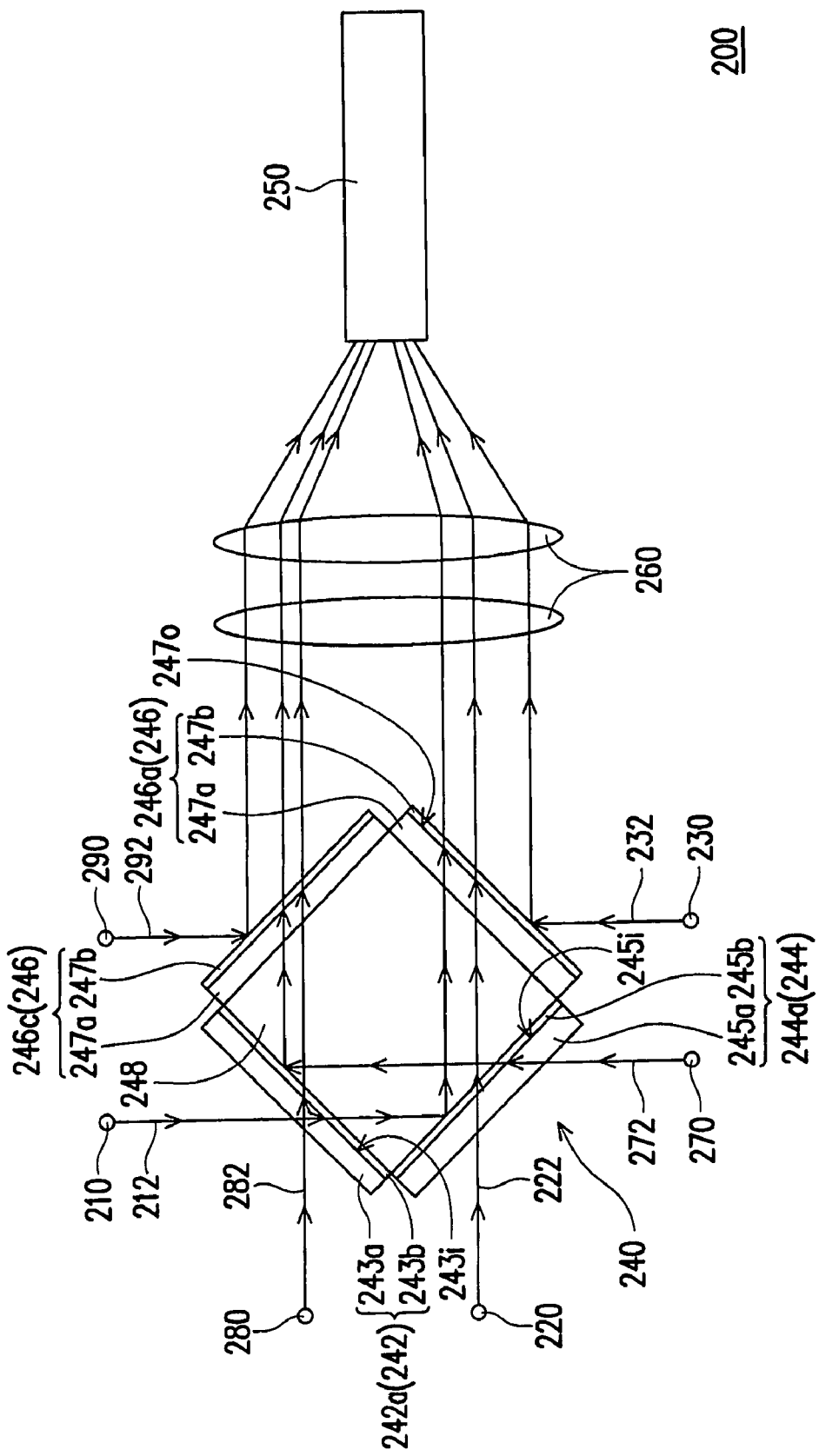
FIG. 3A is a schematic structural view of an illumination system according yet another embodiment of the present invention.
Figure 3B:
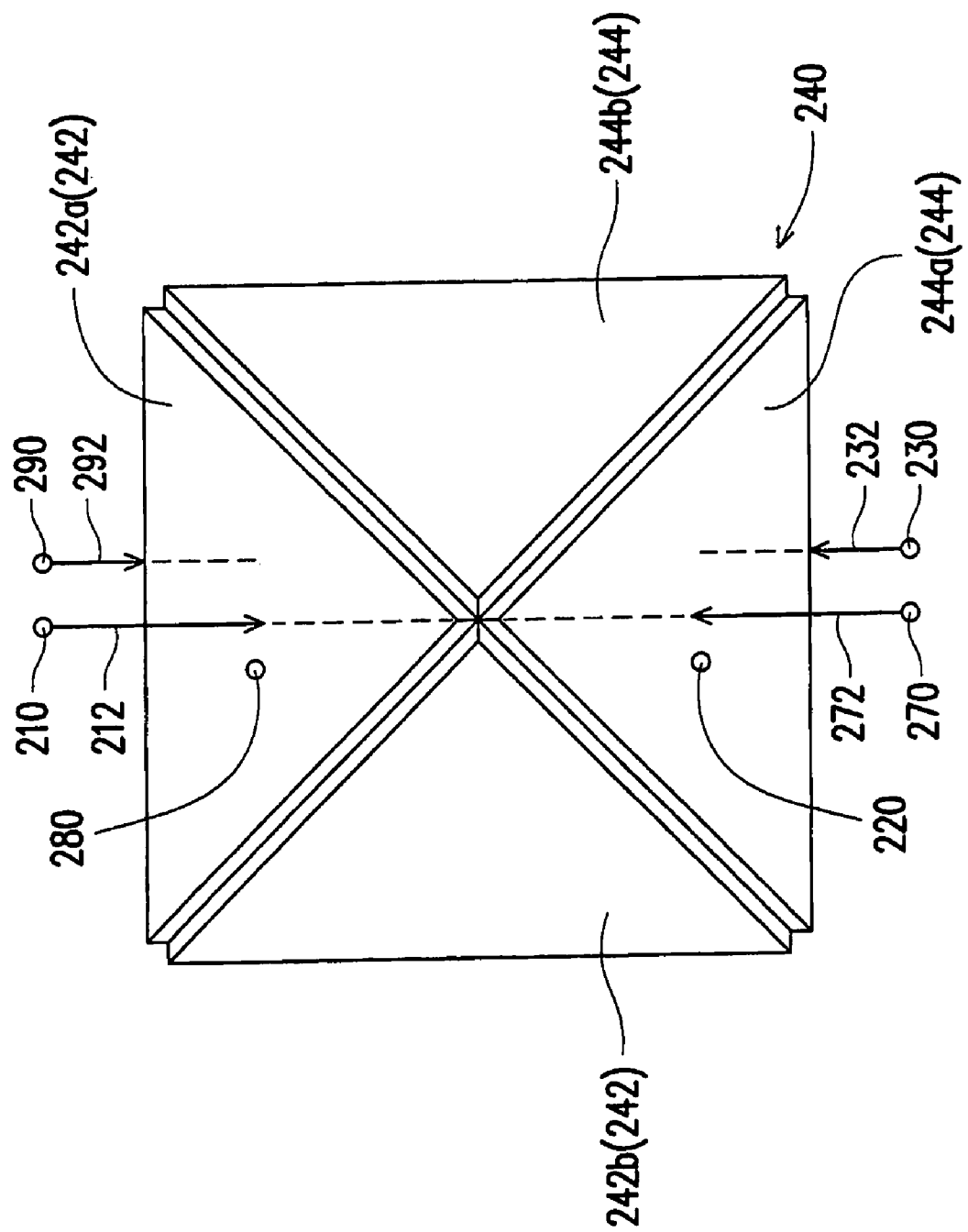
FIG. 3B is a schematic top view of the prism and the light sources in FIG. 3A.
Figure 3C:
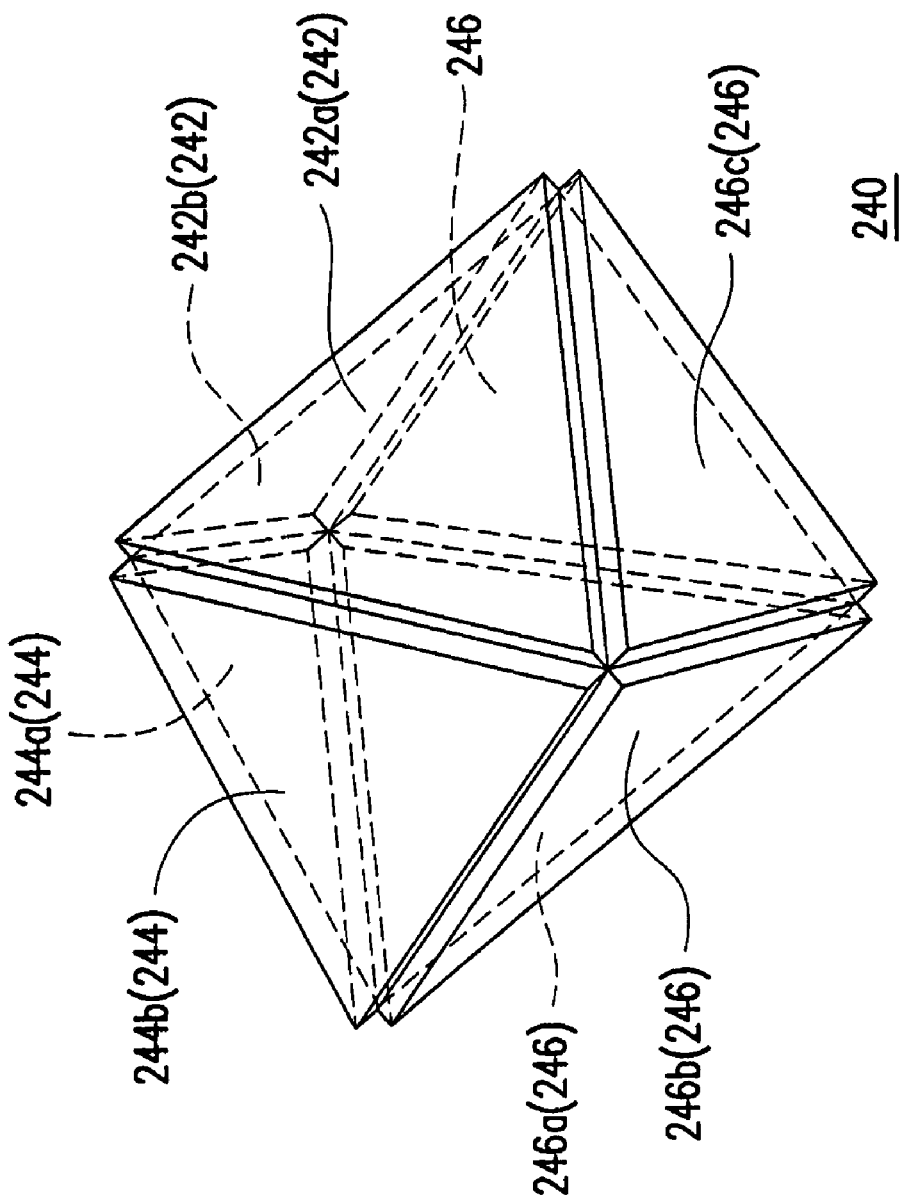
FIG. 3C is a schematic perspective view of the prism in FIG. 3A.

Referring to FIGS. 3A to 3C, an illumination system 200 includes a first light source 210, a second light source 220, a third light source 230, a beam combining device 240 and a light uniforming device 250. The first light source 210 is capable of providing a first color beam 212. The second light source 220 is capable of providing a second color beam 222. The third light source 230 is capable of providing a third color beam 232. Colors of the first color beam 212, the second color beam 222 and the third color beam 232 are different from one another. The beam combining device 240 includes two first dichroic units 242, two second dichroic units 244 and four third dichroic units 246. The two second dichroic units 244 are disposed opposite to the two first dichroic units 242, respectively. As shown in FIG. 3B, the second dichroic unit 244a is disposed opposite to the first dichroic unit 242a, and the second dichroic unit 244b is disposed opposite to the first dichroic unit 242b. Two of the third dichroic units 246 are disposed opposite to the two first dichroic units 242 respectively, and the other two of the third dichroic units 246 are disposed opposite to the two second dichroic units 244 respectively. For example, the third dichroic unit 246a is disposed opposite to the first dichroic unit 242a, the third dichroic unit 246c is disposed opposite to the second dichroic unit 244a, and the third dichroic unit 246b is disposed opposite to the first dichroic unit 242b.

The first color beam 212 passes through one of the first dichroic units 242 (such as the first dichroic unit 242a), is reflected by one of the second dichroic units 244 (such as the second dichroic unit 244a) opposite to the one of the first dichroic units 242, and passes through one of the third dichroic units 246 (such as the third dichroic unit 246a) adjacent to the one of the second dichroic units 244 (such as the third dichroic unit 244a) in order. The second color beam 222 passes through the one of the second dichroic units 244 (such as the second dichroic unit 244a) and the one of the third dichroic units 246 (such as the third dichroic unit 246a) in order. The third color beam 232 is reflected by the one of the third dichroic units 246 (such as the third dichroic unit 246a). The light uniforming device 250 is disposed on transmission paths of the first, second and third color beams 212, 222 and 232 from the one of the third dichroic units 246.

In this embodiment, the light uniforming device 250 is, for example, a light integration rod. However, in other embodiments, the light uniforming device 250 is also a lens array. In addition, the illumination system 200 further includes at least one lens 260 disposed on the transmission paths of the first, second and third color beams 212, 222 and 232 between the beam combining device 240 and the light uniforming device 250. Moreover, the light sources, such as the first, second and third light sources 210, 220 and 230, in the illumination system 200 is the same as the light sources in the illumination system 100 shown in FIG. 1A.

In this embodiment, each of the dichroic units (such as the first 242, second 244, and third dichroic units 246) includes a substrate and a dichroic film disposed on the substrate. More particularly, each of the first dichroic units 242 includes a substrate 243a and a dichroic film 243b, each of the second dichroic units 244 includes a substrate 245a and a dichroic film 245b, and each of the third dichroic units 246 includes a substrate 247a and a dichroic film 247b. In this embodiment, the dichroic film 243b of each of the first dichroic units 242 is disposed on an inner surface 243i of the substrate 243a of the same first dichroic unit 242. The dichroic film 245b of each of the second dichroic units 244 is disposed on an inner surface 245i of the substrate 245a of the same second dichroic unit 244. The dichroic film 247b of each of the third dichroic units 246 is disposed on an outer surface 247o of the substrate 247a of the same third dichroic unit 246. However, in other embodiments, the dichroic units (such as the first, second and third dichroic units) are also just dichroic films rather than the combination of the dichroic films and the substrate.

In addition, the beam combining device 240 further includes an octahedral prism 248 for supporting the dichroic units, i.e. the first, second and third dichroic units 242, 244 and 246. The octahedral prism 248 has eight facets, and the first, second and third dichroic units are respectively disposed on the facets. However, in other embodiments, the beam combining device is also hollow and have no octahedral prism.

The illumination system 200 further includes a fourth light source 270, a fifth light source 280 and a sixth light source 290 for providing a fourth color beam 272, a fifth color beam 282 and a sixth color beam 292, respectively. A color of the fourth color beam 272 is substantially the same as the color of the second color beam 222, a color of the fifth color beam 282 is substantially the same as the color of the first color beam 212, and a color of the sixth color beam 292 is substantially the same as the color of the third color beam 232. The fourth color beam 272 passes through the one of the second dichroic units 244 (such as the second dichroic unit 244a), and is reflected by the one of the first dichroic units 242 (such as the first dichroic unit 242a) opposite to the one of the second dichroic units 244, and passes through another one of the third dichroic units 246 (such as the third dichroic unit 246c) adjacent to the one of the first dichroic units 242 (such as the third dichroic unit 242a), and travels to the light uniforming device 250 in order. The fifth color beam 282 passes through the one of the first dichroic units 242 (such as the first dichroic unit 242a) and the another one of the third dichroic units 246 (such as the third dichroic unit 246c) in order, and then travels to the light uniforming device 250. The sixth color beam 292 is reflected to the light uniforming device 250 by the another one of the third dichroic units 246 (such as the third dichroic unit 246c). In other words, the first dichroic units 242 are capable of allowing beams with the first color and the fifth color to pass through and reflecting beams with the fourth color. The second dichroic units 244 are capable of allowing beams with the second color and the fourth color to pass through and reflecting beams with the first color. The third dichroic units 246 are capable of allowing beams with the first, second, fourth and fifth color to pass through and reflecting beams with the third and sixth color.

In the illumination system 200 in this embodiment, the wavelength tolerance of the dichroic units (i.e. the first, second and third dichroic units 242, 244 and 246) is larger, such that the cost of the beam combining device 240 is low, which reduce the cost of the illumination system 200. In addition, the beam combining device 240 combines six beams in this embodiment, such that the illumination system 200 has high flexibility of the light source design and provides illumination with high brightness. The illumination system 200 also has other advantages similar to those of the above illumination system 100a shown in FIG. 2A.

It should be noted that the number of the light sources is not limited to six in the present invention. In other embodiment, the number of the light sources is other value. For example, the illumination system just has the first, second and third light sources but no fourth, fifth and sixth light sources. Besides, the number of each of the first to sixth light sources is two. The two first color beams pass through the two first dichroic units, respectively. The two second color beams pass through the two second dichroic units, respectively. The two third color beams are reflected by the two third dichroic units, respectively. The two fourth color beams pass through the two second dichroic units, respectively. The two fifth color beams pass through the two first dichroic units, respectively. The two sixth color beams are reflected by the two third dichroic units, respectively. In other words, the illumination system combines twelve beams.

Figure 4:
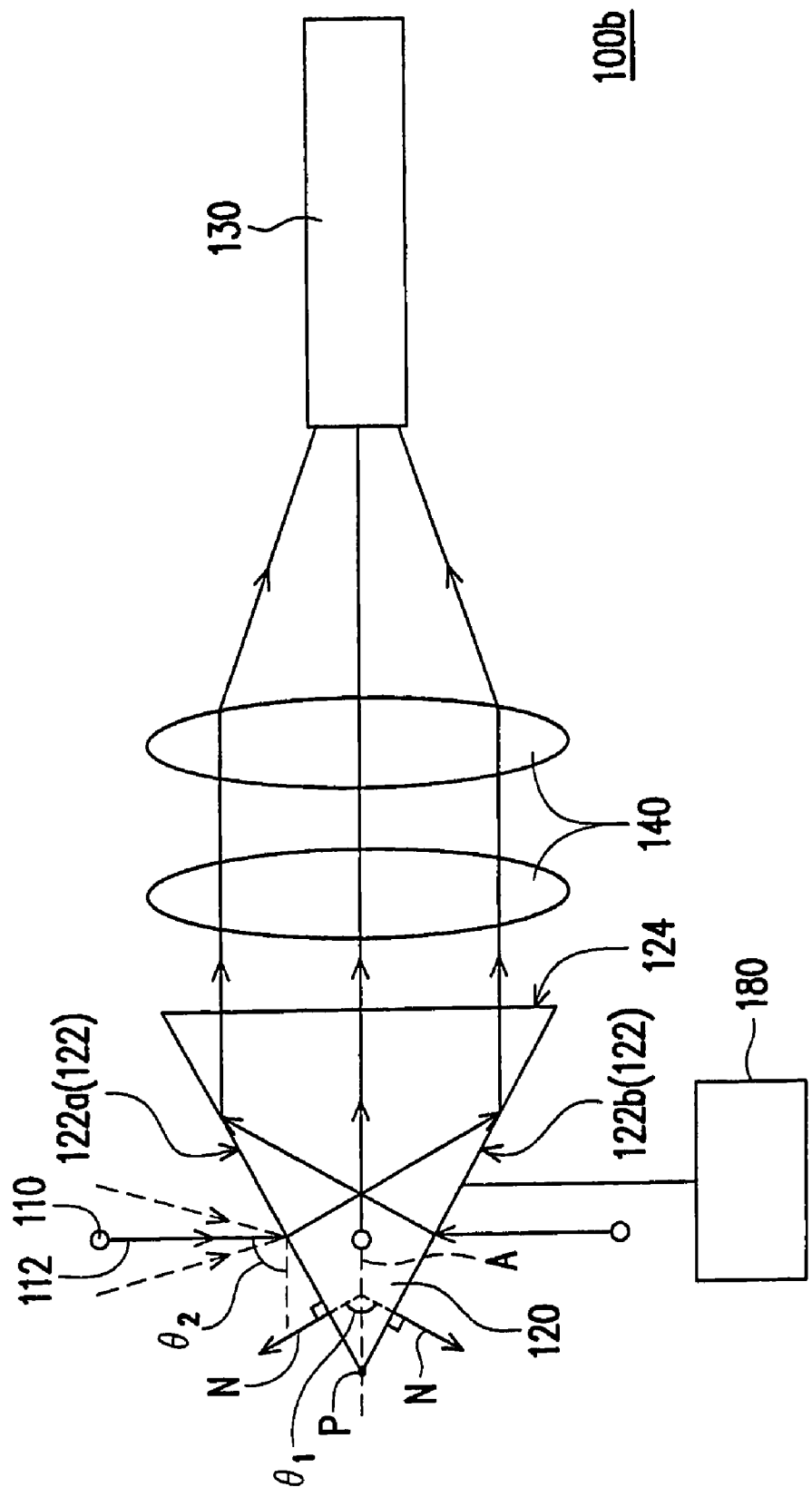
FIG. 4 is a schematic structural view of an illumination system according to still another embodiment of the present invention.

Referring to FIG. 4, an illumination system 100b in this embodiment is similar to the above illumination system 100 shown in FIG. 1A, except that the illumination system 100b further includes an actuator 180 connected with the first prism 120 for driving the first prism 120 to rotate along the symmetry axis A of the four first facets 122 (i.e. the symmetry axis of the first prism 120). The actuator 180 is a motor or other suitable actuator. When the first light sources 110 are lasers, the above illumination 100 shown in FIG. 1A generates a speckle phenomenon. However, by rotating the first prism 120 in the illumination system 100b, the speckle phenomenon is reduced.

Figure 5:
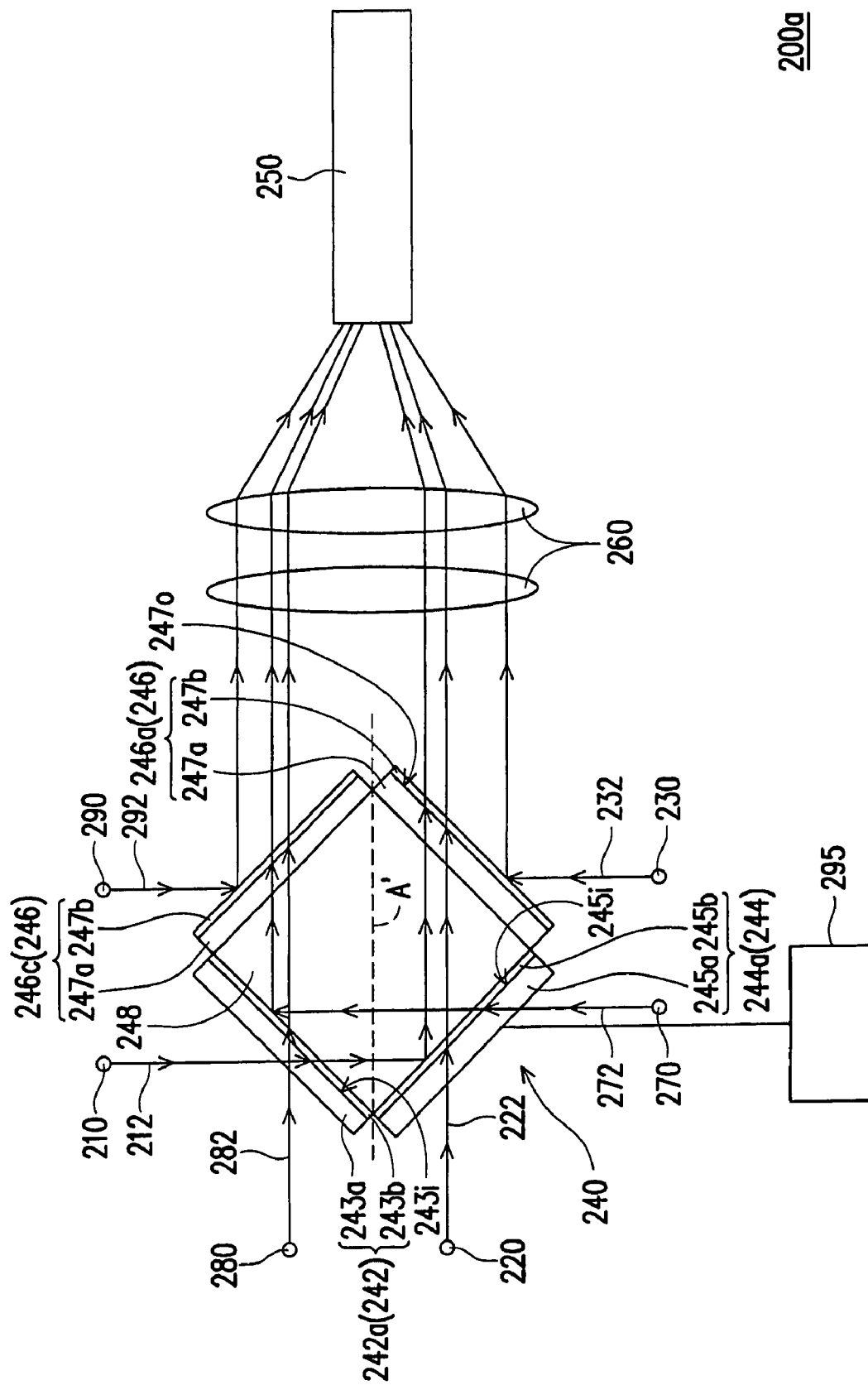
FIG. 5 is a schematic structural view of an illumination system according to yet still another embodiment of the present invention.

FIG. 5 is a schematic structural view of an illumination system according to yet still another embodiment of the present invention. Referring to FIG. 5, an illumination system 200a in this embodiment is similar to the above illumination system 200 shown in FIG. 3A, except that the illumination system 200a further includes an actuator 295 connected with the beam combining device 240 for driving the beam combining device 240 to rotate along a symmetry axis A' of the four third dichroic units 246 (i.e. the symmetry axis of the beam combining device 240), so as to reduce the speckle phenomenon.

It should be noted that the actuator is also applied in the above illumination system 100a shown in FIG. 2A or illumination systems in other embodiments to reduce the speckle phenomenon.

Figure 6:
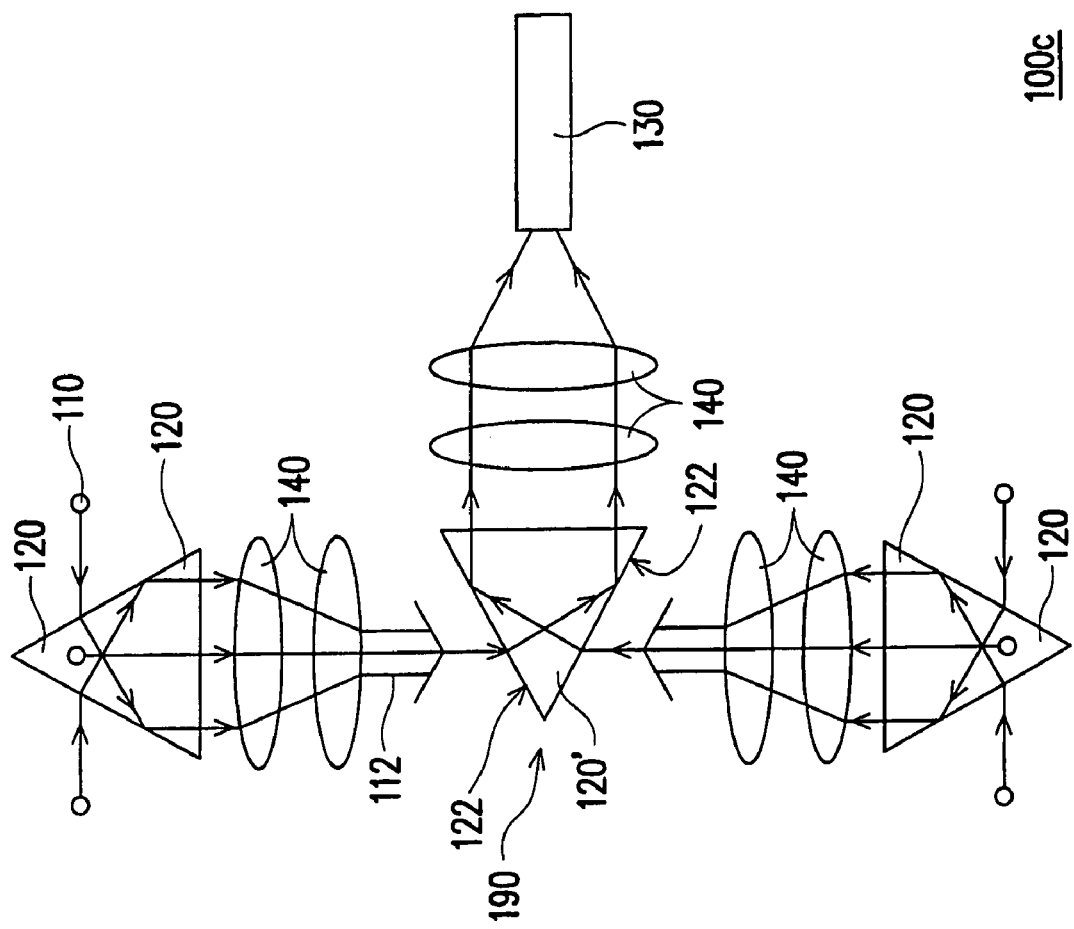
FIG. 6 is a schematic structural view of an illumination system according to still another embodiment of the present invention.

FIG. 6 is a schematic structural view of an illumination system according to still another embodiment of the present invention. Referring to FIG. 6, an illumination system 100c in this embodiment is similar to the above illumination system 100 shown in FIG. 1A, and the differences between the two are described below. In this embodiment, the illumination system 100c includes a plurality of first prisms 120 and a plurality of first light sources 110. In addition, the illumination system 100c further includes a beam combining device 190 disposed on transmission paths of the first beams 112 provided by the plurality of the first light sources 110 and from the first prisms 120 for combining the first beams 112 and making the first beams 112 travel to the light uniforming device 130.

In this embodiment, the beam combining device 190 includes a second prism 120' which is the same as the first prism 120, wherein "the same" means that the second prism 120' also has facets similar to those of the first prism 120. Each of the first beams 112 passes through one of the first facets 122 of the second prism 120', and is reflected by another first facet 122 opposite to the one of the first facets 122 of the second prism 120', and then travels to the light uniforming device 130. It should be noted that the beam combining device 190 is not limited to have only one second prism 120' in the present invention. In other embodiments, a beam combining device may also have a plurality of the second prisms. In the present embodiment, the first beams 112 combined by the beam combing device 190 are the double of the first beams 112 in the illumination system 100 shown in FIG. 1A, such that the illumination system 100c has higher flexibility of the light source design, and provides illumination with higher brightness, and increases the contrast of the picture projected by the projection apparatus. In other embodiments, the first beams 112 combined by the beam combing device 190 is also the triple or quadruple of the first beams 112 in the illumination system 100 shown in FIG. 1A. In yet other embodiments, the beam combining device has a plurality of second prism 120', so as to combine more first beams.

Figure 7:
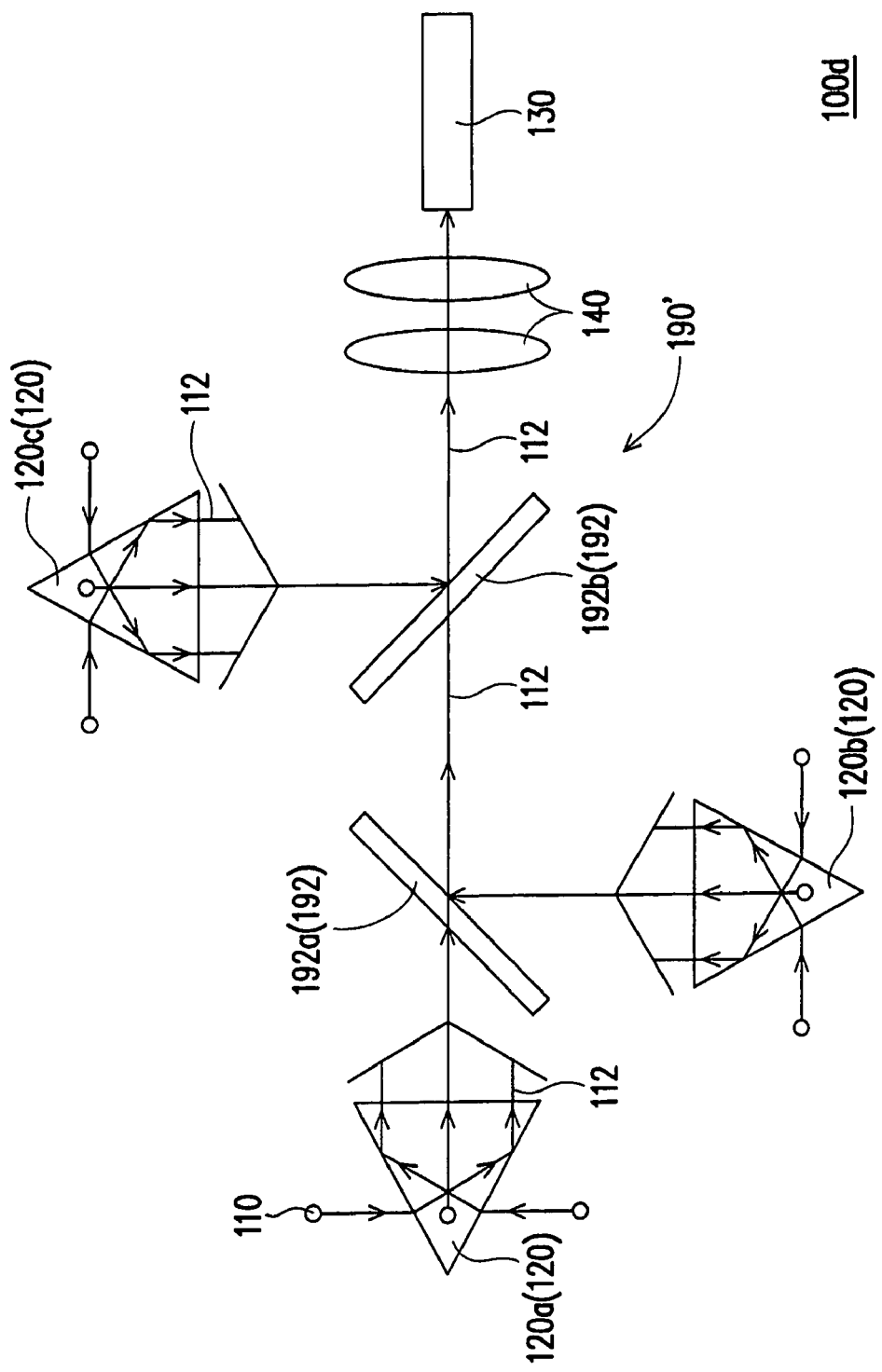
FIG. 7 is a schematic structural view of an illumination system according to still another embodiment of the present invention.

FIG. 7 is a schematic structural view of an illumination system according to still another embodiment of the present invention. Referring to FIG. 7, an illumination system 100d in this embodiment is similar to the above illumination system 100c shown in FIG. 6, and the differences between the two are described below. A beam combining device 190' of the illumination system 100c includes at least one dichroic unit 192, and at least parts of the first beams 112 are combined by the dichroic unit 192. The dichroic unit 192 is, for example, a dichroic mirror. However, in other embodiments, the dichroic unit is also a dichroic prism or other suitable transmission devices. In this embodiment, the first prisms 120 include the first prisms 120a, 120b and 120c, and the illumination system 100d includes the dichroic units 192a and 192b. The first beams 112 exiting from the same first prism 120 have the same color, and the first beams 112 exiting from the different first prisms 120 have different colors. The dichroic unit 192a is capable of allowing the first beams 112 from the first prism 120a to pass through and reflecting the first beams 112 from the first prism 120b, so as to combine the first beams 112 from the first prism 120a and the first prism 120b. The dichroic unit 192b is capable of allowing the first beams 112 from the dichroic unit 192a to pass through and reflecting the first beams 112 from the first prism 120c, so as to combine the first beams from the first prisms 120a, 120b and 120c. The illumination system 100d has similar advantages to those of the illumination system 100c shown in FIG. 6. In addition, the number of the dichroic units 192 is not limited to two in the present invention. In other embodiments, the number of the dichroic unit(s) is other value.

It should be noted that the beam combining device 190 or 190' is also applied in the above illumination system 100a, 100b, 200 and 200a, and the beam combining device in other embodiments includes the first prism 120a and the dichroic unit 150 or include the beam combining device 240.

Based on the above, in the illumination system according to an embodiment of the present invention, the angle made by the normal vectors of every two first facets opposite to each other is designed to make each first beam be totally internally reflected by one of the first facets, such that each first beam is collimated rather than condensed. Therefore, the first prism and the second prism are not necessary for resisting high temperature caused by the condensed beam as in the prior art, which makes the materials of the first prism and the second prism be selected from more inexpensive ones. Besides, the dichroic units are also inexpensive, so as to reduce the cost of the illumination system. Moreover, because the heat-resistant reflecting film as in the prior art can be not needed in the illumination system, the cost of the illumination system is reduced.

In addition, the first prism or the second prism of the illumination system is capable of combining a lot of beams, such that the illumination system has a lot of first light sources, so as to have high flexibility of the light source design and provide illumination with high brightness. Moreover, when the illumination system is applied in a projection apparatus, it increases the contrast of the picture projected by the projection apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
    at least one first light source, capable of providing at least one first beam;
    at least one first prism, disposed on a transmission path of the first beam, and having four first facets, wherein two of the first facets are opposite to each other, the other two of the first facets are opposite to each other, wherein the first beam passes through one of the first facets and is totally internally reflected by another first facet opposite to the one of the first facets, and the first prism has an apex located among the four first facets and a symmetry axis passing through the apex; and
    a light uniforming device, disposed on the transmission path of the first beam from the another first facet.

2. The illumination system as claimed in claim 1, wherein the first prism further has a second facet, and the first beam reflected by the another first facet travels to the light uniforming device through the second facet.

3. The illumination system as claimed in claim 1, wherein the first prism further has four third facets respectively opposite to the four first facets, two of the third facets are opposite to each other, and the other two of the third facets are opposite to each other.

4. The illumination system as claimed in claim 3, further comprising:
    four dichroic units, disposed on the four third facets respectively; and
    at least one second light source, capable of providing at least one second beam, wherein the second beam is reflected to the light uniforming device by one of the dichroic units, the first beam from the another first facet passes through the one of the dichroic units, and colors of the first beam and the second beam are different from each other.

5. The illumination system as claimed in claim 3, further comprising at least one third light source, capable of providing at least one third beam, wherein the third beam passes through one of the first facets and one of the third facets opposite to the one of the first facets in order, and then travels to the light uniforming device.

6. The illumination system as claimed in claim 1, wherein normal vectors of every two first facets opposite to each other make an angle falling in a range from 38 degrees to 69 degrees, and a refractive index of the first prism falls in a range from 1.4 to 1.78.

7. The illumination system as claimed in claim 1, wherein an incident direction of the first beam incident on the first prism and the symmetry axis make an angle falling in a range from 70 degrees to 110 degrees.

8. The illumination system as claimed in claim 1, further comprising a beam combining device, wherein the at least one first prism is a plurality of first prisms, the at least one first light source is a plurality of first light sources, and the beam combining device is disposed on transmission paths of first beams provided by the plurality of the first light sources and from the first prisms, for combining the first beams and making the first beams travel to the light uniforming device.

9. The illumination system as claimed in claim 8, wherein the beam combining device comprises a second prism, the second prism is the same as the first prism, each of the first beams passes through one of the first facets of the second prism of the beam combining device, and is reflected by another first facet opposite to the one of the first facets of the second prism of the combining device, and then travels to the light uniforming device.

10. The illumination system as claimed in claim 8, wherein the beam combining device comprises at least one dichroic unit, and at least parts of the first beams are combined by the dichroic unit.

11. The illumination system as claimed in claim 1, further comprising at least one lens, disposed on the transmission path of the first beam between the first prism and the light uniforming device.

12. The illumination system as claimed in claim 1, further comprising an actuator, connected with the first prism for driving the first prism to rotate along a symmetry axis of the four first facets.

13. An illumination system, comprising:
   at least one first light source, capable of providing at least one first color beam;
   at least one second light source, capable of providing at least one second color beam;
   at least one third light source, capable of providing at least one third color beam, wherein colors of the first color beam, the second color beam and the third color beam are different from one another;
   a beam combining device, comprising:
      two first dichroic units;
      two second dichroic units, disposed opposite to the first dichroic units respectively;
      four third dichroic units, two of the third dichroic units disposed opposite to the two first dichroic units respectively, and the other two of the third dichroic units disposed opposite to the two second dichroic units respectively, wherein the first color beam passes through one of the first dichroic units, is reflected by one of the second dichroic units opposite to the one of the first dichroic units, and passes through one of the third dichroic units adjacent to the one of the second dichroic units in order, the second color beam passes through the one of the second dichroic units and the one of the third dichroic units in order, and the third color beam is reflected by the one of the third dichroic units; and
   a light uniforming device, disposed on transmission paths of the first, second and third color beams from the one of the third dichroic units.

14. The illumination system as claimed in claim 13, further comprising:
   at least one fourth light source, capable of providing at least one fourth color beam, wherein a color of the fourth color beam is substantially the same as the color of the second color beam;
   at least one fifth light source, capable of providing at least one fifth color beam, wherein a color of the fifth color beam is substantially the same as the color of the first color beam; and
   at least one sixth light source, capable of providing at least one sixth color beam, wherein a color of the sixth color beam is substantially the same as the color of the third color beam, the fourth color beam passes through the one of the second dichroic units, and is reflected by the one of the first dichroic units opposite to the one of the second dichroic units, passes through another one of the third dichroic units adjacent to the one of the first dichroic units, and travels to the light uniforming device in order, the fifth color beam passes through the one of the first dichroic units and the another one of the third dichroic units in order, and then travels to the light uniforming device, and the sixth color beam is reflected to the light uniforming device by the another one of the third dichroic units.

15. The illumination system as claimed in claim 13, wherein each of the first, second and third dichroic units comprises:
   a substrate; and
   a dichroic film, disposed on the substrate.

16. The illumination system as claimed in claim 15, wherein the dichroic film of each of the first dichroic units is disposed on an inner surface of the substrate of the same first dichroic unit, the dichroic film of each of the second dichroic units is disposed on an inner surface of the substrate of the same second dichroic unit, and the dichroic film of each of the third dichroic units is disposed on an outer surface of the substrate of the same third dichroic unit.

17. The illumination system as claimed in claim 13, wherein the beam combining device further comprises an octahedral prism, having eight facets, and the first, second and third dichroic units are respectively disposed on the facets.

18. The illumination system as claimed in claim 13, further comprising at least one lens, disposed on the transmission paths of the first, second and third color beams between the beam combining device and the light uniforming device.

19. The illumination system as claimed in claim 13, further comprising an actuator, connected with the beam combining device for driving the beam combining device to rotate along a symmetry axis of the four third dichroic units.

* * * * *